Dec. 1, 1959 W. J. ANDERSON Re. 24,743
ELECTRICAL MUSICAL INSTRUMENT
Original Filed Oct. 17, 1955
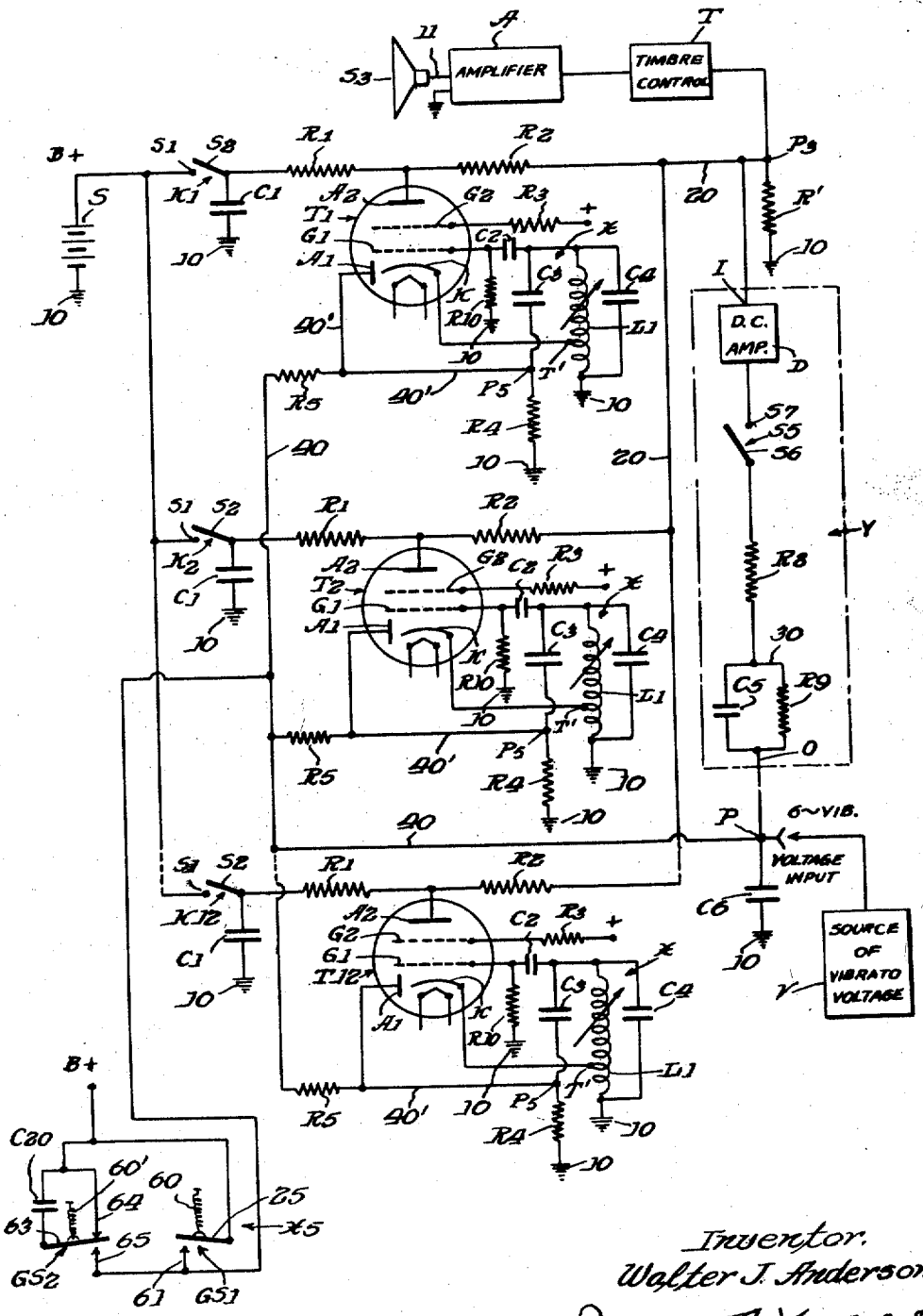
Inventor.
Walter J. Anderson.
By James A. Koene.
Atty.

United States Patent Office

Re. 24,743

Reissued Dec. 1, 1959

24,743

ELECTRICAL MUSICAL INSTRUMENT

Walter J. Anderson, Elgin, Ill., assignor to Chicago Musical Instrument Company, Chicago, Ill., a corporation of Illinois Original No. 2,854,879, dated October 7, 1958, Serial No. 540,828, October 17, 1955. Application for reissue June 10, 1959, Serial No. 819,522

18 Claims. (Cl. 84—1.24)

Matter enclosed in heavy brackets [ ] appears in the original patent but forms no part of this reissue specification; matter printed in italics indicates the additions made by reissue.

This invention relates to electrical musical instruments and more particularly to instruments employing tone frequency generators respectively producing audio signals at the pitches of sequentially related notes of the even tempered scale, in which instrument, electric switches are adapted to be operated by playing-keys to selectively transmit waveforms of tone frequencies to an electroacoustic translating system for conversion thereof into audible sounds for musical expression.

This application is a continuation in part of my application, Serial No. 455,605, filed September 13, 1954.

An object of the invention is the provision of means whereby portamento, glissando, slurring, sliding and gliding effects typical of the Hawaiian guitar, violin, trombone, trumpet and other wind and string instruments may be simulated electronically by exceedingly simple electrical circuits employing only a very small number of inexpensive electrical components.

[Other objects and advantages of the invention will hereinafter appear from the following description and accompanying drawing in which the figure is a schematic illustration of my invention when embodied in an electrical network employing tone signal sources from which selected tone signals are adapted to be transmitted to an electroacoustic translating system when playing a keyboard of an electric organ or other keyboard musical instrument.]

*Other objects and advantages of the invention will hereinafter appear from the following description and accompanying drawing which schematically illustrates my invention embodied in an electrical network employing tone signal sources as respective master oscillators connected in cascade with follower stages for producing output tone signals at octave separation.*

The term "portamento" as used herein shall mean—gliding of a tone from one note to the next with sufficient rapidity that the intermediate notes are not defined as would be the case in a "legato" passage between two principal notes, which effect is frequently produced when playing such instruments as the Hawaiian guitar, violin, trombone, trumpet and other string and wind instruments. The term "portamento" shall include effects commonly referred to as "slurs" or "smears" obtained by lip and jaw adjustments and by throat and chest stresses when playing the clarinet, saxophone, trumpet and other wind instruments. The effect is also had by detuning to produce a sound that is flat relative to a note of a different pitch. Taking, for example, the trombone, slipping the slide from one note to another without changing a steady application of wind pressure, as compared with playing tones, the pitches of which are well detached. In the case of the Hawaiian guitar and other string instruments, detuning is accomplished by the player sliding his fingers along the frets, gliding up to true pitch. The violinist accomplishes this by approaching a given note from a quarter to a half semi-tone, then moving up to true pitch by rocking or sliding his fingers along the strings. It is these various effects that are faithfully simulated electronically by the method and apparatus now to be described in detail.

[In carrying the invention into practice, the accompanying schematic illustration discloses a tone generating system comprising an electrical network having therein similar space discharge tubes providing individual tone frequency sources at the vibration frequencies of different notes of the even tempered scale. The three tubes shown in said schematic illustration are respectively designated T1, T2 and T12, the frequencies of the output signals of which are T1, note $C^2=1046$ cycles per second; note $C\#2=1108$ cycles per second; and note $B^2=1975$ cycles per second, based on the scale, "A" 440 vibrations per second.]

*In carrying the invention into practice, the accompanying schematic illustration discloses a tone generating system comprising an electrical network having therein similar space discharge tubes adapted to operate as master oscillators for follower or slave stages producing signals at octave separation in a manner well known in the art. The three master oscillators are respectively designated T1, T2 and T12, the frequencies of the output signals of which are T1, note $C^2=1046$ cycles per second; note $C\#^2=1108$ cycles per second; and note $B^2=1975$ per second, based on the scale, "A"=440 vibrations per second. That is to say, there will be twelve master oscillators sensibly the same as tubes T1, T2 and T12, each functioning as a master oscillator and connected in cascade with a desired number of follower stages producing signals at octave separation. Such systems are fully disclosed in the Larsen Patents Nos. 2,403,090, 2,470,705, Re. 23,376 and 2,545,665 and in Larsen et al. Nos. 2,568,644 and 2,410,883.*

The frequency sources can comprise a system of sources for furnishing tone frequencies for any given number of octave as may depend upon the gamut of the instrument. Each source may have a plurality of signal output paths in parallel enabling divided portions of the output of said source to be used, as and when needed as a tonal component at different places in the instrument, such, for example, at the playing-key switches of the instrument's manuals and pedal clavier, etc. Instruments of the prior art that teach this plural use of the output from a single tone-producing source are several in number, such, for example, the disclosure in United States Letters Patent to Cahill, [No. 1,295,691] *No. 1,295,691 and as shown in the patent to Hammond No. 1,956,350. See resistors 528 at Figure 27.* While the invention is primarily designed, adapted and intended for use in combination with an electric organ or similar keyboard musical instrument, it may nevertheless take the form of an instrument complete in itself and adapted to be played from a single keyboard, preferably, so to speak, a split keyboard as disclosed in United States Letters Patent to Koehl, No. 2,250,065, which enables different tonalities to be played at the same time from different sections of the keyboard, generally a section below middle C and a section above middle C. However, when the invention is combined with an organ having more than a single keyboard and a liberal number of "stops" enabling most any music to be played as written, there is the advantage, namely, that when a musical score is written for both sustained organ-like tones and percussive tones requiring portamento and like effects, these different results can be best accomplished when playing different manuals. There is the further advantage which is that tone sources as described and shown herein can be used for a dual purpose, i.e. sources of waveforms of tone signals for organ-like and orchestral tones and as sources for producing tones with portamento effects. The invention may also be manufactured as a melody instrument by connecting a single oscillator in an electrical keying system having means for tuning the circuit for different tone frequencies according as different keys of a keyboard are played individually. Instruments of this general class are shown and described in prior United States Letters Patent to De Forest, No. 1,543,990, and Patent No. 2,083,246 to Smiley.

[In carrying my invention into practice, multi-electrode thermionic tubes are employed as sources respectively furnishing audio output signals at the tone frequencies of different notes of the even tempered scale. Three such sources, T1, T2 and T12 are shown—T1 and T2 respectively representing notes C and C# and T12, note B of an octave of notes at any suitable place in the gamut of the instrument.] *In carrying my invention into practice, twelve multi-electrode thermionic tubes are employed as master oscillators respectively producing audio output signals of given musical frequencies. Sources T1, T2 and T12 will each deliver to a next succeeding follower stage a signal for operating said stage at a frequency which is the octave of the signal delivered thereto. The tubes comprising the divider stages may be of the same as the tubes comprising said master oscillators or any well known type having electrodes of the kind and number adapted to function in the manner now to be described.* Each tube has *an indirectly* [a directly] heated cathode K, a control grid G1, a screen grid G2, a plate A2, and (*except for the followers*), an additional electrode A1—the latter adapted to form the plate of a diode, the purpose of which will be hereinafter explained. A source S of B+ potential has its negative terminal connected to ground 10 and its positive terminal to contact elements S1 of respective playing-key operated electric switches K1, K2 and K12. In each tube circuit the positive side of source S also connects to screen grid G2 via a load resistor R3. Plate A2 of the tube is connected to contactor S2 of a respective switch K1, K2, K12 and to condenser C1 by load resistor R1 in circuit path 20 which terminates at signal output point P3. Condensers C1 of the respective switches connect the contactors S2 of the switches to common ground 10. The plate A2 of each tube is also connected in path 20 by a resistor R2 located between resistor R1 and said output point P3 load resistor R′ connecting point P to ground 10. Coupled to point P3 is any well-known timbre control system T, the said system including an audio amplifier A in the output circuit 11 of which is a loud speaker S3. The control grid of each tube is connected to ground 10 by a load resistor R10, and, as shown, said grid is coupled by a blocking condenser C2 to a tuned L–C tank circuit X comprising a tank coil L1 and primary and secondary tuning condensers C4 and C3 respectively—condenser C4 being connected directly across coil L1, whereas condenser C3 is indirectly connected across said coil through conductor 40′, electrode A1 and cathode K. Said cathode connects to tap T′ of said tank coil. Resistor R4 connects electrode A1 to ground 10.

Referring again to the respective tubes T1, T2 and T12, the cathode K, control grid G1 and screengrid G2 of each tube, together with resistor R3 in the screen grid circuit and condenser C2 and resistor R 10 in the tank circuit X, form a conventional L–C oscillator in which condensers C4 and C3 are the primary and secondary capacitative elements— the effectiveness of condenser C3 being a function of the instantaneous resistance of electrode A1 and the cathode K. Said electrode and the cathode form in each tube circuit the conducting link connecting condenser C3 across tank coil L1, thereby providing a path which operates as a variable switch, in which condenser C3 becomes a variable tuning element in the tank circuit. Assuming that sufficient auxiliary positive voltage is applied to electrode A1, electrons are conducted to said electrode subsequently lowering its resistance. Assuming that negative potential is applied to electrode A1, conduction of electrons thereto ceases and the electrode-cathode path becomes an open circuit. In this condition, condenser C3 is disconnected from the tank circuit, thereby causing the resonant frequency thereof to rise. In the absence of the described condition in which respective positive and negative potentials are applied to electrode A1, the resistance of the electrode has a steady state which is the function of the alternating audio frequency voltage of the tank circuit supplied said electrode via secondary condenser C3. An average resistance is readily established with judicial use of component values to be named later.

When a six cycle vibrato input voltage is applied to electrode A1 via path 40 and isolation resistor R5, the impedance in the branch path 40′ which connects electrode A1 in the tank circuit at point P5 between resistor R4 and condenser C3, changes alternately, being first smaller, then larger than the average resistance in said path, thereby rendering the condenser alternately effective as a tuning element in said tank circuit. This respectively lowers and raises the resonant frequency of said condenser at said six cycle rate. The vibrato source V employed for this purpose connects to input point P and may be of any well known form, the vibrato shown and described in the Larsen et al. Patent No. 2,568,644 being one such well known form, or, use can be made of the vibrato disclosed in my copending application, Serial [No. 479,784.] *No. 479,784, now Patent No. 2,814,726.*

A control system X5 comprising a pedal-operated switch GS1 is manually actuable for producing inharmonic effects, the pivoted contactor 25 of said switch being resiliently biased at 60 to a position of disengagement thereof from contact element 61. When used with an organ, said switch would be mounted on the console at an elevation where it can be conveniently operated by the foot. When contactor 25 of switch GS1 engages contact element 61, B+ voltage is applied to electrode A1 through isolation resistor R5, causing a heavy conduction of electrons to said electrode from cathode K, thereby lowering the resistance of said electrode. This connects condensor C3 across the tank circuit and lowers the resonant frequency of the circuit for the duration of time that the contactor 25 engages contact element 61. Assuming that one or more switches K1, K2, K12 to be close-circuited, the plate A2 of the tube becomes conductive of electrons emitted from cathode K and an audio signal is developed across resistors R1, R2 and conducted to signal output point P3 and transmitted to timbre control system T and from the latter to amplifier A where the signal is amplified to activate loud speaker S3, the pitch of the signal having been previously flattened, the signal will then be restored to its given pitch as a function of time when X5 is returned to an "off" position. I place particular stress upon this feature of my invention in that, and to the best of my knowledge, detuning for portamento and like effects has never before been accomplished electronically by any other person or devices of the prior art. It will be borne in mind that during depression of contactor 25 of switch GS1 the six cycle vibrato input at point P is short-circuited, thereby cutting off the vibrato, with the result that the audible portamento effect produced at said loud speaker occurs incident to first shutting off the vibrato succeeded by gradually restoring the signal to its original frequency and vibrato rate as the signal decays and the sound at the loud speaker remains audible.

Resiliently biased switch GS2 provides an auxiliary control in coaction with condenser C20. When contactor 63 is disengaged from contact element 64 and engaged with contact 65, B+ voltage is applied to electrode A1 for a duration of time corresponding to the time required to charge said condenser through resistors R5 and R4.

When switch GS2 is in a condition biased by spring 60′, contactor 63 engages contact element 64 and discharges condenser C20, conditioning same for recharging, the player having no control of the duration of the charging and discharging time.

Referring to the elements contained in the dot and dash rectangle Y at the upper right portion of the drawing, provision is made for automatic detuning when any signal key switch is operated to sound a note. When contactor S6 of switch S5 is closed against contact element S7 and a D.C. voltage appears across load resistors R1, R2 and conductor 20 simultaneously with application of voltage to condenser C1 and plate A2, this voltage is applied to the input I of amplifier D (whose output is at 0) where it is amplified in proper proportion and transmitted through switch S5 and resistors R8 and applied as a condenser charging surge through condenser C5 via conductor 40 and resistor R5 to electrode A1, thereby causing detuning or an inharmonic effect. However, as soon as condenser C5 approaches a complete charge, the voltage applied to electrode A1 diminishes to practically zero. Thus, detuning is, so to speak, only temporary or during the keying of a given note—the duration being a function of the actual time required to charge condenser C5. Resistor R9 is relatively large and serves only to discharge the condenser during the interval between successive depressions of the playing-key operated switches. Hereinafter the resistors R8, R9 and condenser C5 will be referred to as a resistive-condenser mesh. The term "switch means" shall be broadly construed to embrace switch K1, switch S5 and switches GS1 and GS2 as the terms used in certain of the appended claims. The term "automatic" is used in the text and as it refers to the mechanism in the "dot-dash block" shall be construed to mean that as each note of a keyed melody is sounded, the pitch becomes flattened for a predetermined period of time without requiring the attention of the player to any controls.

When switch S5 is closed, D.C. voltage appearing at P3 (as the result of depressing playing-key S2) is conducted through resistor R8 and network 30 and to point P of path 40, the resultant flattening in pitch being like that when the foot-operated switch GS1 is closed.

For satisfactory results, the values of the resistors and capacity sizes of the condensers referred to herein are given in the following tables:

TABLE OF VALUES

| Condensers: | Microfarads |
|---|---|
| C1 | .5 |
| C2 | .01 |
| C3 | .0047 |
| C4 | .01 to .04 |
| C5 | .5 |
| C6 | .01 |
| **Resistors:** | **Ohms** |
| R1 | 1,000,000 |
| R2 | 2,000,000 |
| R3 | 22,000 |
| R4 | 1,000,000 |
| R5 | 270,000 |
| R10 | 270,000 |
| R′ | 270,000 |
| R8 | 270,000 |
| R9 | 5,000,000 |

Inductance $L_1$=500 to 1000 millihenries.

A more complete description of the operation of the invention is as follows:

In the accompanying drawings, switches comprising playing-key operated elements S2 and the selectively actuable elements GS1 and GS2 are in open circuit conditions. Diode plates A1 are at negative potential.

In these conditions of the above-named elements and bearing in mind that primary condenser C4 and coil L1 are the main tuning elements in tank circuit X, and secondary condenser C3 is only partially effective in said circuit, i.e. not completely in parallel with condenser C4. It will be assumed also that with the elements in the described conditions, the vibrato circuit is in an "off" condition. The instrument can now be played as a conventional organ and chords and/or single tones sustained without diminution in frequency thereof as long as the playing-key operated switch elements S2 remain close-circuited. In this self-biased condition of the electron stream between diode plate A1 and cathode K, the paths to common ground 10 are via coil L1, self-biasing load resistor R4 and path 40′, the latter including isolation resistor R5. The steady state normal bias resistance of the electron stream as induced by the A.C. audio signal applied to the diode plate A1 can be considered equal to about 33,000 ohms.

When switch GS1 is close-circuited, B plus voltage is applied to diode plate A1. This causes a dense flow of electrons thereto from cathode K with the result, so to speak, that the "normal resistance" in the electron stream drops to approximately 2,000 ohms, at which time condenser C3 is, for all practical purposes, completely in parallel with condenser C4 in the tank circuit and is active as a detuning means in the tank circuit, as the capacity has been changed relative to its predetermined tuned condition. In consequence thereof, there is rapid diminution in frequency of the output signal. It follows that as distinguished from the functionality of the various elements when switch GS1 is open-circuited, the sound emitted at loud speaker S3 audibly glides rapidly as typical of a portamento.

Upon depressing switch GS2, a momentary B plus voltage surge is applied through condenser C20 in the mesh containing said switch, which surge flattens the pitch of the output tone signal for only that duration equal to the time to charge the condenser as a function of the time constants of the condenser and resistances R5 and R4.

This detailed description of the operation of my invention can be read on any one of the tank circuits shown in the accompanying drawing—it being understood that these circuits and the elements contained therein are sensibly identical. It is further understood that switches GS1 and GS2 are common to all tone generators comprising said tank circuits.

The gist of the invention is the herein disclosed means for electronically carrying or gliding a keyed tone of given pitch towards the next succeeding note or notes in the scale to thereby flatten the tone, following which the tone is gradually restored to its original pitch as a function of the time constants of electrical components and electrical energy so that the overall audible effect at a loud speaker is typical of portamento and like effects obtained when playing certain musical instruments. I am aware of devices for electronically simulating plucked string effects by condenser-resistive time circuits to control the attack and decay of tone, the pitch remaining constant—i.e. non-changing, throughout the entire time the tone speaks. In the instant invention, however, while use is made of condenser-resistive means for varying as a function of time, the rate of attack and decay of the tone, the pitch of the tone is and must necessarily change, i.e. made to sound flat, followed immediately by a rise by restoration of the tone to its given or normal pitch as the sound decays, the resultant sound being thus audibly distinguishable from sound that merely grows and/or decays as a simple function of the time constants of a time circuit.

To the best of my knowledge, no one prior to my invention has ever before embodied in an electric organ means for producing a normally stable output signal of a given note frequency and means in combination therewith for rapidly lowering said frequency to make audible at a translating system a rapid gliding of tone, i.e. flattening the pitch of any keyed tone. It shall be borne in mind, also, that the function thus served by the herein-disclosed combination of elements is attainable at the will of the player as a function supplemental or in addition to use of the outputs of the thermionic tubes T1, T2 and T12 for the production of tones that can be sustained for such interval of time without diminution in frequency thereof. *An important feature of my invention consists in the provision of means for causing a continuous unidirectional change in frequency of the output signal of a respective tone generator, the change being fast, causing a fast gliding of pitch with a percussive effect and flattening of tone when depressing a playing key simultaneous with activation of switch GS2 and/or GS1 and then causing gradual decay of the tone and restoration thereof to its stable frequency when the key is released, as distinguished from a vibrato which changes the pitch rapidly and in alternation, i.e. first "flat" and then "sharp," or vice versa.*

*The terms "destabilizing" and/or "destabilizing means" used in this description and in the claims shall mean that the normal playing pitch of the instrument shall be continuously flattened by a substantial amount and for a period of time which is dependent upon the will of the player, this effect making for portamento results as distinguished from periodic flattening and sharpening at a vibrato rate over which the player has no control other than to turn it off or on.*

*The master controlling tubes T1, T2 and T12 have their screen grids G2 coupled by condensers to control grids of respective follower tubes to provide output signals at octave separation to the signals originating at said controlling tubes. For the sake of economy, the following tubes are of the same type as controlling tubes T1, T2 and T12 but can be of any well known type having electrodes adapted to function in the manner of the cathode K, control grid G1, screen grid G2 and plate A2 comprising said tubes T1, T2 and T12. Condensers such as described above are well known in the art and are pointed to at C4, Figures 2 and 2A in Larsen Patent No. 2,403,090 and at C2 and C3 in Larsen et al. No. 2,568,644 and at 10—10$^{IV}$ in Larsen No. 2,470,750.*

What I claim as my invention is:

[1. In an electrical musical instrument, a plurality of tank circuits each including a stable tone frequency generator, a key-operated switch and an electro-acoustic output system common to said circuits, each tank circuit also including an electrically activatable destabilizing means, and a manually controllable source of potential operatively connected to said destabilizing means.]

2. An electrical musical instrument comprising a plurality of generators each including a tuned circuit producing a stable audio output signal of given tone frequency, an electro-acoustic translating system, means including a key-operated switch for each generator enabling selective conduction to said translating system of the output signal of said generator, and means including a selectively controllable switch for *unidirectionally* destabilizing the circuit common to a generator from which a signal is being conducted so as to vary the frequency of said signal and then cause restabilization of said circuit and restoration of said signal to its given frequency.

3. An electrical musical instrument according to claim 2, wherein a source of potential is provided and connected in circuit with the key-operated switches and the generators for activating the generators for conduction of the output of the generators to said translating system as aforestated.

4. A musical instrument according to claim 2 wherein means are embodied in circuit with each generator and the translating system for sustaining as a function of time sound resulting from translation of the conducted signal.

5. A musical instrument according to claim 2 wherein there is included a source of potential electrically coactive with said tuned circuits and said selectively controllable switch for causing said destabilization and restabilization respectively of said circuits.

6. A musical instrument according to claim 2 wherein means are employed in electrical coaction with the second named means for controlling as a function of time the rate of destabilization and restabilization of said circuits.

7. An electrical musical instrument comprising a generator producing an output signal of given tone frequency, an electro-acoustical translating system connected to said generator for translating said signal into audible sound, a depressible playing key-operated switch for said generator actuable to conduct the output signal thereof to said translating system and means coactive with said generator for *lowering* [varying] the frequency of said signal then restoring said signal to said given frequency, said means including a source of potential, a selectively actuable switch connected to said source, a tank circuit including a primary and a secondary condenser, and electrically activated means in circuit with said secondary condenser for varying the reactance of said tank circuit thereby destabilizing said generator to *lower* [vary] the frequency of the output signal *as aforestated.*

8. In a musical instrument, a tone generator comprising a space discharge device, a tank circuit in which said generator is operatively connected, said circuit including a primary condenser and a secondary condenser, the secondary condenser connected [normally only partially in parallel] to the primary condenser[.] such that the reactance of said tank circuit effects a stabilized operating condition of said space discharge device for the production by said device of a stable output tone signal, a translating system coupled to the generator, a keying circuit connecting the output of the generator to the translating means, and a selectively controllable impedance in circuit with the secondary condenser for changing the reactance of the tank circuit thru a path containing said secondary condenser, thereby *lowering* [varying] the frequency of the output signal being conducted to the translating means from said generator.

9. An electrical musical instrument comprising a plurality of generators respectively producing output signals at predetermined tone frequencies, an output system connected to said generators for translating said signals into audible sounds, a depressible playing key-operated switch for each generator for causing conduction of its output signal to said translating system, and means coactive with said generators for *lowering* [varying] the frequency of the output signal of any generator than restoring said signal to its predetermined frequency, said means including a selectively actuable control switch.

10. An electrical musical instrument comprising a generator producing an output signal of given tone frequency, an electro-acoustic translating system connected to said generator for translating said signal into audible sound, a depressible playing-key operated switch for said generator actuable to conduct the output signal thereof to said output system and means coactive with said generator for *lowering* [varying] the frequency of said signal then restoring said signal to said given frequency, said means including a selectively actuable control switch.

11. In an electrical musical instrument a space discharge device producing a stable output signal of given tone frequency, a tank circuit in which said device is connected for stable operation thereof, and means including a diode connected in said tank circuit for *unidirectionally* varying the reactance of said circuit and correspondingly varying the frequency of said output signal, and means for selectively activating the diode.

12. An electrical musical instrument according to claim 11 in which means are employed for effecting said activation of said diode as a function of time.

13. A musical instrument comprising a source producing a stable output signal at a given tone frequency, said source including a first tuning means and a second tuning means, and means for activating the second tuning means to detune said source *to lower* [with resultant variation in] the frequency of the output signal and then deactivating said second tuning means to restore a stable operation of said source with resultant restoration of the output signal to said given tone frequency.

14. In an electrical musical instrument, a tone signal translating system, a tone signal producing source coupled to said translating system means for tuning said source for production of a stable output signal and selectively actuable means for *unidirectionally* detuning said source with resultant variation in the frequency of said output signal.

15. An electrical musical instrument comprising a plurality of tone generators, each generator comprising a tank circuit having primary and secondary tuning condensers, the secondary condenser adapted to be placed in any one of two different capacitative conditions in said circuit and serving when in one of said conditions to establish and maintain said tank circuit capacitatively operative for the production of a stable output signal of given tone frequency and when in the other condition to cause *an increase* [variation] in the capacitance in said tank circuit with resultant diminution in frequency of said signal; a playing-key operated switch for each of said generators enabling withdrawal of signals therefrom; and selectively actuable mechanism common to all of said generators and including a variable impedance in each tank circuit for electronically placing the secondary condensers in the tank circuits of all of said generators in either one of said two different conditions.

[16. In an electrical musical instrument employing a playing-key and a switch actuable thereby; an LC-oscillator having in its tank circuit a vacuum tube comprising a cathode and a plate and primary and secondary tuning condensers, in which the secondary tuning condenser is normally only partially connected in parallel with said primary tuning condenser, the capacitance in said tank circuit being such that said vacuum tube produces a stable output signal of given tone frequency; a source of B plus voltage; an output system to which the oscillator is coupled and said playing-key operated switch is connected to said plate and to said source of B plus voltage for applying voltage to said plate from said source and withdrawing signal voltage from said tube for transmission thereof to said output system; means electronically coactive with said cathode and embodying an element which is variable from a state of high ohmic resistance when B plus voltage is removed therefrom to cause a lowering of said resistance when B plus voltage is applied to said element; said element operatively coupled to said secondary condenser and adapted when B plus voltage is applied thereto to activate and completely connect same in parallel with said primary condenser, with resultant variation in the capacitance of said tank circuit and diminution in frequency of said output signal; and means including a source for selectively applying B plus voltage to and removing same from said element.]

17. In a musical instrument, a plurality of electrical generators each including a control circuit normally generating a stabilized output signal of given tone frequency; means including a playing-key operated switch for each generator adapted when close-circuited to effect withdrawal of the generated signal; and means connected in common to all of said generator control circuits and including a manually actuable switch for electronically changing normal operation of said generator control circuits to lower the frequency of the output signals of said generators *according as* [when] said manually actuable switch is close-circuited and *any* [the] playing-key operated switches [are] *is* also close-circuited and then restoring said generator control circuits to their normal operating conditions upon open-circuiting said manually actuable switch.

18. In an electrical musical instrument, an electrical network having therein a tuned circuit including a tuning condenser and a space-discharge device producing an output signal of given note frequency, an output system for translating said signal into audible sound, and a keying-circuit adapted when close-circuited to cause conduction of said signal to said output system; and mechanism for selectively detuning said circuit to lower the frequency of said signal and produce audible portamento and like sound effects at said output system; said detuning mechanism comprising a source of voltage, a circuit having therein a switch resiliently biased to an open circuit condition and connected to said source and adapted to be manually closed as desired, and a variable impedance device to ground connected to said switch and capacitatively connected in said tuned circuit, said switch serving, when close-circuited, to impress voltage from said source on said impedance device to lower the resistance thereof and activate said tuning condenser *thereby varying* [to vary] the capacitance of said tuned circuit with resultant diminution in frequency of said output signal and production at said output system of the aforementioned sound effects.

*19. In an electrical musical instrument, a tank circuit including a stable tone frequency generator, an electro-acoustic transducer, a key-operated switch operatively interconnecting said tank circuit and said transducer, a unidirectional destabilizing means operatively connected to said tank circuit, a source of potential, and a manually operable switch interconnecting said source of potential and said unidirectional destabilizing means.*

*20. An electrical musical instrument according to claim 19, wherein, means are employed in coaction with said destabilizing means for controlling as a function of time the rate of said destabilization and the rate of restabilization of said generator.*

References Cited in the file of this patent
or the original patent

UNITED STATES PATENTS

| | | |
|---|---|---|
| 2,588,551 | McCoy | Mar. 11, 1952 |
| 2,645,968 | Hanert | July 21, 1953 |